United States Patent [19]

Talat et al.

[11] Patent Number: 5,142,141
[45] Date of Patent: Aug. 25, 1992

[54] CRACK GROWTH MEASUREMENT NETWORK WITH PRIMARY AND SHUNT OPTICAL FIBERS

[75] Inventors: Kausar Talat, Redmond; Gary J. Biando, Tacoma, both of Wash.

[73] Assignee: The Boeing Company, Seattle, Wash.

[21] Appl. No.: 585,003

[22] Filed: Sep. 19, 1990

[51] Int. Cl.⁵ .............................................. H01J 5/16
[52] U.S. Cl. ............................... 250/227.15; 340/550
[58] Field of Search ....................... 250/227.11, 227.15, 250/227.18, 227.23; 340/550, 555; 73/800

[56] References Cited

U.S. PATENT DOCUMENTS

| | | | |
|---|---|---|---|
| 3,910,105 | 10/1975 | Hoffstedt | 73/88 A |
| 4,636,638 | 1/1987 | Huang et al. | 250/231 R |
| 4,781,056 | 11/1988 | Noel et al. | 73/1 B |
| 4,808,814 | 2/1989 | Hofer et al. | 250/227.15 |
| 4,836,030 | 6/1989 | Martin | 73/800 |
| 5,015,842 | 5/1991 | Fradenburgh et al. | 340/550 |

FOREIGN PATENT DOCUMENTS 3111858 10/1982 Fed. Rep. of Germany .
3243026 5/1984 Fed. Rep. of Germany .

Primary Examiner—David C. Nelms
Attorney, Agent, or Firm—Fitch, Even, Tabin & Flannery

[57] ABSTRACT

A fiber optic crack propagation measurement apparatus including an input optical fiber for receiving light energy and an output optical fiber connected to deliver light energy to a detector is disclosed. A plurality of shunt optical fibers are connected in parallel between the input and output optical fibers. The input optical fibers, output optical fibers and shunt optical fibers are secured to a structure in which stresses are expected to cause the advancement of a crack. As the crack grows, individual shunt fibers are broken, reducing the amount of light energy delivered to the detector. Detector signals are generated indicative of the light energy received thereby to report the advancement of the crack. In one embodiment, wavelength division multiplexing techniques are employed so that multiple crack measuring units can be monitored over a single monitoring optical fiber.

26 Claims, 3 Drawing Sheets

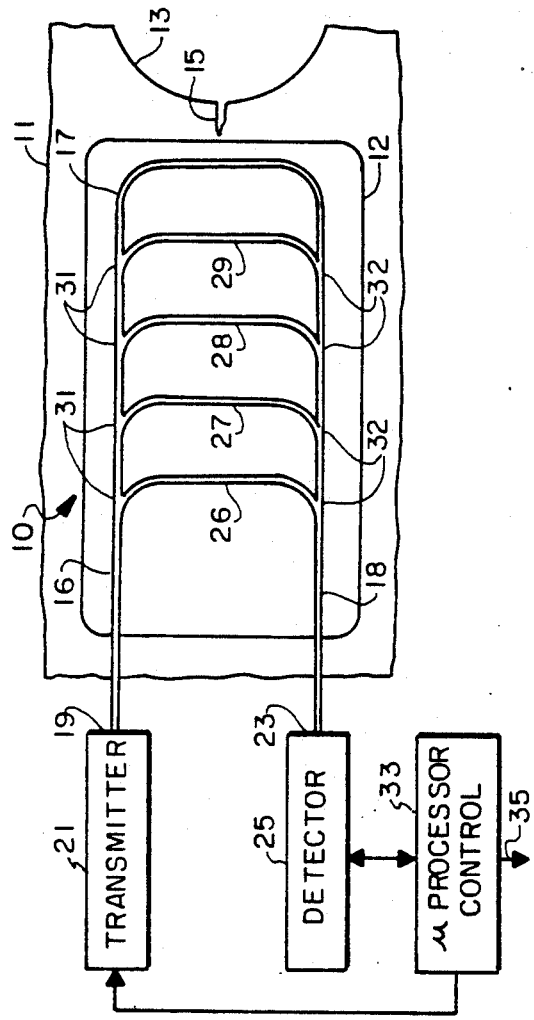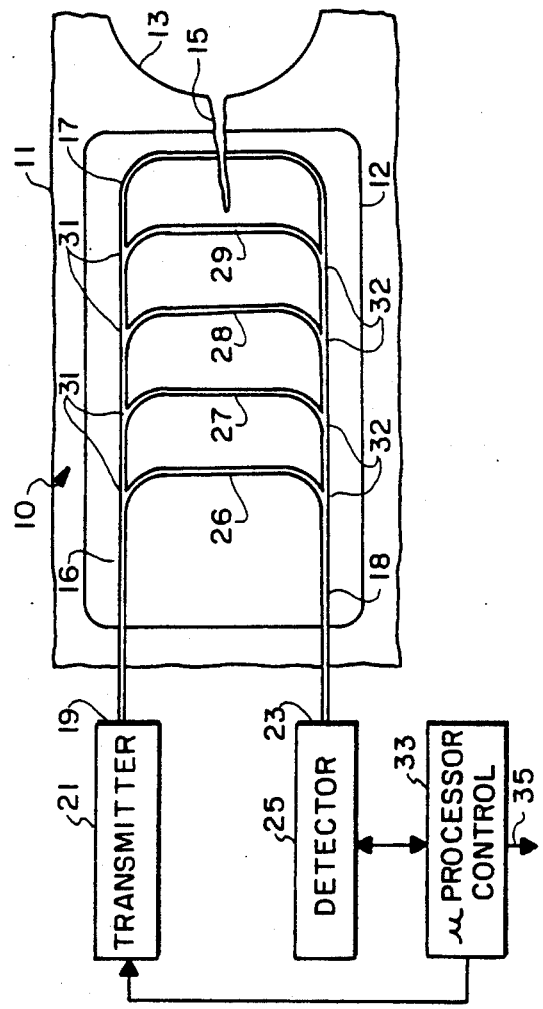
FIG.1
FIG.2

CRACK GROWTH MEASUREMENT NETWORK WITH PRIMARY AND SHUNT OPTICAL FIBERS

BACKGROUND OF THE INVENTION:

This invention relates to materials testing, and more particularly, to strain responsive devices which detect the expansion and elongation of structural members resulting, for example, from crack growth in such members.

Most structural materials weaken with the stresses of continuous use and eventually fail. In the aircraft industry, finding stressed and weakened structural parts before failure is of great importance, because of the catastrophic impact of an operational failure. In the past, aircraft have been periodically removed from service for structural testing. Much of the structural testing is laborious due to the "hidden" nature of the components undergoing tests; out-of-service time adds greatly to the operational expense of the aircraft. Materials testing of operational aircraft is presently being proposed to improve the timeliness of repair and to reduce the lost time devoted to periodic complete testing.

One type of operational testing is the measurement of the separation of normally connected components, such as sections of aircraft skin, and the measurement and detection of cracks in the skin and structure of the airframe. One separation or crack detection arrangement comprises a plurality of resistor strands which are connected in parallel between the terminals of a resistance measuring circuit. The resistive strands are attached to the structure near an existing joint or expected crack area. As the crack or separation widens, the resistor strands are broken, changing the resistance presented to the measuring circuit. The change of resistance, as detected by the measuring circuit, thus indicates the advancement of the crack.

Conventional resistance measurement devices are subject to corrosion and to other problems due to their electronic nature. For example, electrical resistance crack testing can give extraneous readings or the system can fail because of lightning and substantial electromagnetic pulses. Also, the placement of electrical devices on the skin of an aircraft can create significant electromagnetic interference, which is particularly undesirable for military aircraft.

The problems with resistive crack detection have been avoided with other technologies such as fiber optics. U.S. Pat. No. 4,636,638 to Huang, et al., uses a single fiber optic strand which is secured to a surface under test at numerous points. A crack causes separation of the points, stretching the fiber. When the fiber breaks, optical transmission through the fiber is terminated. Thus, when no signal is detected at an output of the fiber, a crack is suspected. This system does not allow monitoring of crack propagation (i.e., growth).

Systems have been proposed, such as disclosed in U.S. Pat. No. 4,836,030 to Martin, which use a plurality of optical fibers each connected to an optical source at one end and to a separate detector at the other end. As a crack advances, the fibers break one at a time and the individual detectors sense when their associated fiber is broken. Output signals of the separate detectors are used to indicate the advancement of a crack by the progression of the detector output signals. Arrangements of the type disclosed in Martin overcome the corrosion and electrical signal problems of resistive detection systems, but the arrangements are large due to the use of multiple optical detectors and multiple optical fibers between a source and the detectors. The large size of such multiple independent fiber systems is incompatible with the space and weight requirements of modern aircraft.

A need exists for a simple, lightweight crack sensing arrangement which avoids the problems of electronic/resistive detection systems while permitting accurate crack localization and progression measurement.

SUMMARY OF THE INVENTION

An optical crack propagation measuring apparatus in accordance with the present invention includes a primary optical fiber for receiving light energy at an input end thereof and for delivering the received light energy to a single detector at an output end. An optical shunt path is connected in parallel with a portion of the primary optical fiber to convey a portion of the received light energy. The measuring apparatus is attached to the structure under test so that as a crack or other separation propagates, the optical fibers of the apparatus will be stressed by crack propagation causing a change in the light energy available to the detector. The single detector monitors the light energy received at the output end of the primary optical fiber. Changes in the signal indicate the progression of the crack. The use of a single primary fiber input and one detector connected to a single primary fiber output for monitoring the shunt path and the primary fiber avoids the problems associated with multiple detectors and fiber outputs of prior systems and provides a small, lightweight system compatible with aircraft demands.

In one embodiment, multiple parallel shunt fibers are used. Each shunt fiber connection to the primary fiber is fabricated to extract a predetermined portion of the light energy from the primary fiber at one end of the shunt fiber and to replace that light energy in the primary fiber at the other end of the shunt fiber. The amount of light energy conveyed by each shunt fiber can be made unique so that a unique light energy amount signature exists for each fiber. Using this signature information the detector is then capable of identifying which of the plurality of shunt fibers broke to create a particular reduction in output light energy amount.

In a preferred embodiment, the primary fiber and shunt fibers are bonded in a predetermined geometric array to a single substrate. Attachment to the substrate fixes the spatial relationship between fibers. The substrate is attached to the structure under test, so that the advancement of a crack will break individual shunt fibers in succession. When a fiber breaks, the optical energy at the primary fiber output is reduced, and the reduction is detected by the detector.

Advantageously, the primary optical fiber conveys an amount of optical energy greater than any shunt fiber. The substrate is attached to the surface under test in such a way that the crack will break the primary fiber before any of the shunt fibers. With the loss of light of the detector from the primary fiber, the detector senses a large light energy change, thereby readily signalling the onset of a crack.

In normal operation, a system including the crack detection apparatus will be removed from service before all of the shunt optical paths are broken. As a result, the detector should always receive some light from the apparatus. In one embodiment, the detector generates system integrity failure signals whenever the light energy received by the detector falls below a predetermined threshold.

With certain structural components such as those fabricated from laminated composite materials, it is desirable to sense cracks, stresses and delamination within the structure, rather than merely at the surface. Because of its small size and relatively inert components, a crack propagation measuring unit of the present invention can be embedded into laminated composite structures by laying the crack monitoring fibers on an internal ply of the composite material. When the optical fibers are brought to the surface of such a material, they should be protected by, for example, a small diameter semi-rigid tube to prevent micro-bending of the fiber.

Further size and weight advantages are achieved by connecting a plurality of individual crack propagation measuring units (i.e., transmitter, primary fiber and shunt fibers), each of which is energized by a distinctive light energy signal, to a single monitor fiber which is then used to monitor multiple areas for possible cracks. The optical source (i.e., transmitter) couples a distinctive light energy signal into an input end of each primary optical fiber. The output end of each primary optical fiber is connected to deliver light energy signals to the single, monitor fiber. A detector is connected to receive the distinctive light energy signals from the monitor fiber and detects changes in the intensity in each distinctive light energy signal. By separately detecting changes in each of the distinctive light energy signal, the crack propagation through each crack propagation measuring unit is detected.

In a preferred embodiment, a plurality of individual crack propagation measuring units are wavelength multiplexed onto a single monitor fiber which is used to monitor multiple areas for possible cracks. The output end of each primary fiber is connected to the single, monitor fiber. A wavelength division de-multiplexer is connected to the monitor fiber and separates optical energy received into the plurality of input wavelengths. The energy at each of these separated wavelengths is then applied to separate detectors, one for each of the optical source wavelengths. Each individual detector then measures the propagation of cracks through the optical fibers of one of the crack propagation measuring units.

BRIEF DESCRIPTION OF THE DRAWINGS

FIG. 1 is a block diagram of an embodiment of the invention for the detection of a crack;

FIG. 2 is substantially the same as FIG. 1 but shows advancement of the crack;

DETAILED DESCRIPTION OF THE PREFERRED EMBODIMENT

Figure 3:
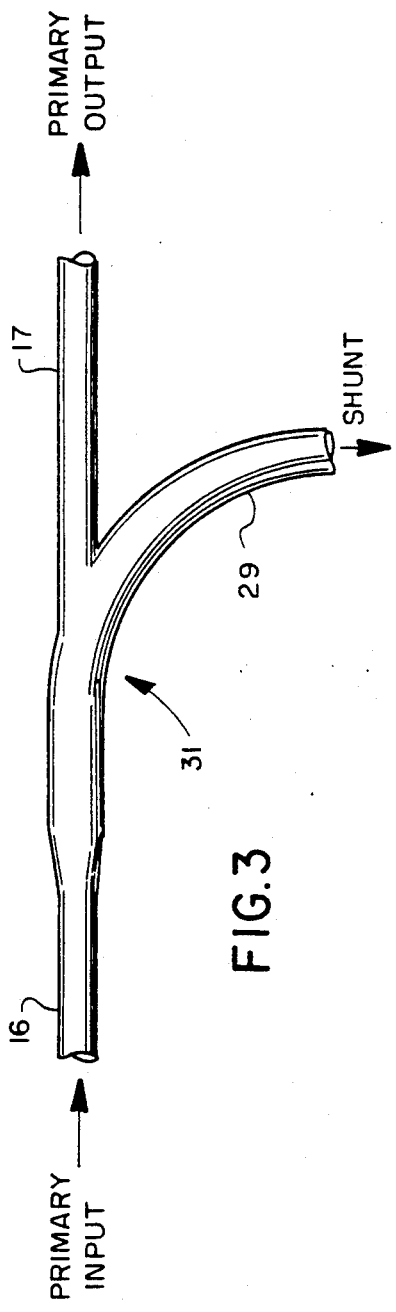
FIG. 3 is a representation of a fused optical coupling (i.e., the shunt junction) shown in FIG. 1.

FIG. 1 shows a portion of a structural member 11 (i.e., the article under test) which includes a circular cut-out 13. In the present example, it is known that the forces applied to member 11 are likely to cause a crack 15 in the structural member because of the cut-out. A crack propagation measuring unit 10 is shown attached to the structural member in a position likely to lie along the run of crack 15.

Crack measuring unit 10 includes a substrate 12 which is affixed to structural member 11. Substrate 12 is of a material which will easily tear as crack 15 advances. Attached to substrate 12 is a primary optical fiber input fiber section 16, a primary optical fiber crack detection section 17, and a primary optical fiber output section 18. The primary optical fiber is generally a multi-mode fiber having a 200 micron core. The primary fiber input section 16 is connected at an input end 19 to an optical transmitter 21, and primary optical fiber output section 18 is connected at an output end 23 to an optical detector 25. Transmitter 21 includes a light source, such as a light emitting diode or a semiconductor laser projecting light energy into primary fiber section 16 through input end 19. Detector 25 comprises, for example, a PIN diode for receiving light energy of the wavelengths produced by transmitter 21. Crack measuring unit 10 also includes a plurality of optical shunt fibers 26 through 29, which are optically connected between input primary fiber section 16 and output primary fiber section 18 in parallel with one another and in parallel with the end primary fiber section 17. The primary optical fiber crack detection section 17 and the shunt fibers 26 through 29 are attached to the substrate in parallel with one another and spaced apart by approximately 1 mm. Each of the shunt fibers 26 through 29 is a multi-mode fiber having a 200 micron core and substrate 12 is a thin layer of ceramic (50 to 100 microns thick) which does not significantly impede mechanical coupling from the crack to the fibers, so that as a crack progresses along member 11, both the substrate and overlying fibers will separate. The fibers are positioned perpendicular to the direction of crack propagation to define indices along the axis of crack propagation. This orientation allows measurement of crack propagation by monitoring breakage of individual fibers.

Each of the shunt fibers 26 through 29 is connected to receive optical energy from input section 16 by means of fused couplings 31 in which the shunt fiber is in fact fused into the optical media of the primary fiber. The other end 32 of each shunt fiber e.g., 26 is also connected to output section 18 by another fused coupling. FIG. 3 is representative of all of the fiber fused couplings, although it specifically shows coupling 31 connecting input primary fiber section 16 to shunt fiber 29.

Each of the fiber couplings 31 is asymmetrical in that approximately 10% of the optical energy arriving in the input primary fiber 16 at a coupling 31 is diverted through the shunt fiber, while the remaining 90% is left to travel in the primary fiber. The return optical connection 32 of each of the shunt fibers 26 through 29 couples substantially all the optical energy conveyed by its associated shunt fiber e.g., 29 to the output primary fiber 18. Table 1 shows the optical energy, normalized to input optical energy of 100%, conveyed by the parallel fibers 17 and 26 through 29.

TABLE 1

| Fiber | Optical Energy (% of Input) |
| --- | --- |
| 26 | 10 |
| 27 | 9 |
| 28 | 8.1 |
| 29 | 7.3 |
| 17 | 65.6 |

Of course, splits of other amounts of optical energy might be used. FIG. 2 shows a crack measuring unit 10 attached to a structure in which crack 15 has advanced to the point of breaking primary crack detection section 17. When section 17 is broken, the optical signal received by detector 25 decreases by approximately two-thirds. Accordingly, detector 25, an optical-to-electrical converter, transmits a lower electrical signal to a microprocessor controller 33 which responds thereto through a comparator by generating an alerting signal on conductor 35. The alerting signal may be displayed to the operator of the equipment or it may be recorded for later review by maintenance personnel.

Should crack 15 continue to grow, optical fibers 29, 28, 27 and 26 would be broken in sequence, each causing a reduction of light energy detected by detector 25 and consequently, with each break, report signals are generated by the controller 33.

Careful placement of optical fiber 17 and shunt fibers 26 through 29 in relation to crack 15 enables an accurate measurement of the location of the crack 15. The length of that crack can be accurately computed by microprocessor controller 33 provided it is programmed with the spatial arrangement of the shunt fibers. For example, if the primary fiber 17 and shunt fibers 26 through 29 are all separated by 1 mm, the length of crack 15 in 1 mm increments can be measured by counting the number of reductions in optical power at detector 25.

Detector 25 and control 33 may cooperate to detect not just changes in light energy, but the actual amount of each light energy change. The amount of light energy change can then be used to identify which fiber must have broken to produce that change. As shown in Table 1, each of the crack detecting fibers 17 and 26 through 29 conveys a different amount of optical energy than the others, which differences can be used by control 33 as a signature to identify the breakage of individual fibers. For example, when shunt fiber 28 breaks, a reduction in light energy output of approximately 8.1% of input light energy will occur and be detected by detector and control 33. Shunt fiber 28 is the only crack detecting fiber which conveys this amount of energy. Thus, control 33 when provided with the light energy signature information of Table 1, can identify that fiber 28 broke. It should be apparent that other coupling percentages than those shown in Table 1 can be used to make the optical energy signature of each fiber more distinct, and thus, easier to detect.

In normal operation, the system which includes the crack measurement unit 10 will be removed from service for repair before all of the fibers 17 and 26 through 29 are broken. As a result, detector 25 should always receive some light energy from primary fiber section 18. The present system uses this fact to provide a system integrity check. Should the light energy received by detector 25 fall to near zero, the failure of the transmitter 21 or a primary optical fiber section 16, 8, is assumed. In the present embodiment, whenever the light level falls below that which is conveyed by the last shunt fiber, a system integrity failure signal is generated.

All optical networks, and particularly optical couplings, cause some loss of optical signal strength. These losses were not discussed in the preceding description to facilitate understanding of the principles of operation. In an actual system, the coupling factors of the shunt fibers can be planned to compensate for such losses so that the breakage of each fiber causes a sufficiently significant change in light energy at output 23 to be detected by detector 25.

The optical fibers of the crack measuring unit are shown in FIG. 1 as being attached to a substrate 12, which is in turn, attached to the structure to be tested. Accuracy, integrity, and ease of application is improved in this way. Although the use of the substrate is preferred, the crack measuring unit can also be used without a substrate by bonding the individual optical fibers directly to the structural member to be tested.

Many aircraft components are currently being fabricated from laminated composite materials. Such materials are formed by a plurality of alternating layers or plies which typically are impregnated with a pre-mixed resin system (i.e., prepregs). Not only can the subject crack measuring units be attached to the surface of composite components, but they can also be embedded between the layers of composite material during fabrication. When embedded, the optical output can be used to measure stresses on the components which include the detector.

Figure 5:
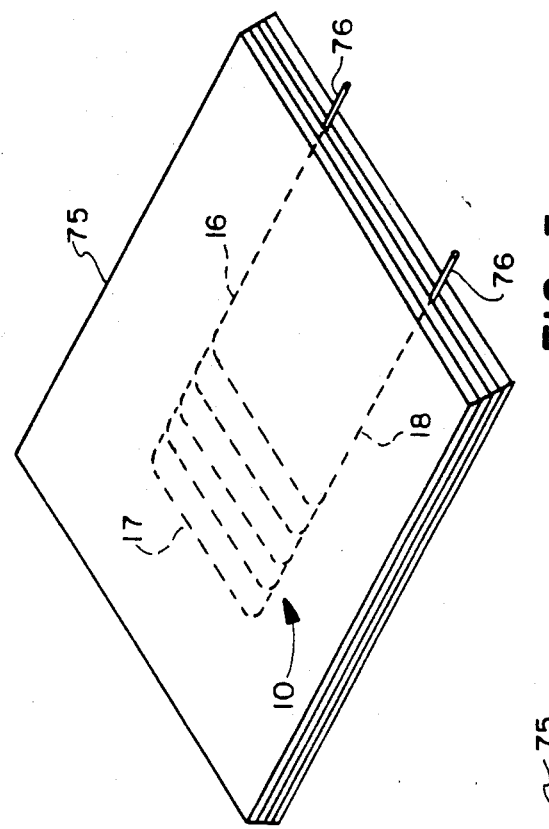
FIG. 5 represents a crack measurement apparatus of FIG. 1 embedded in a laminated composite structure.
Figure 6:
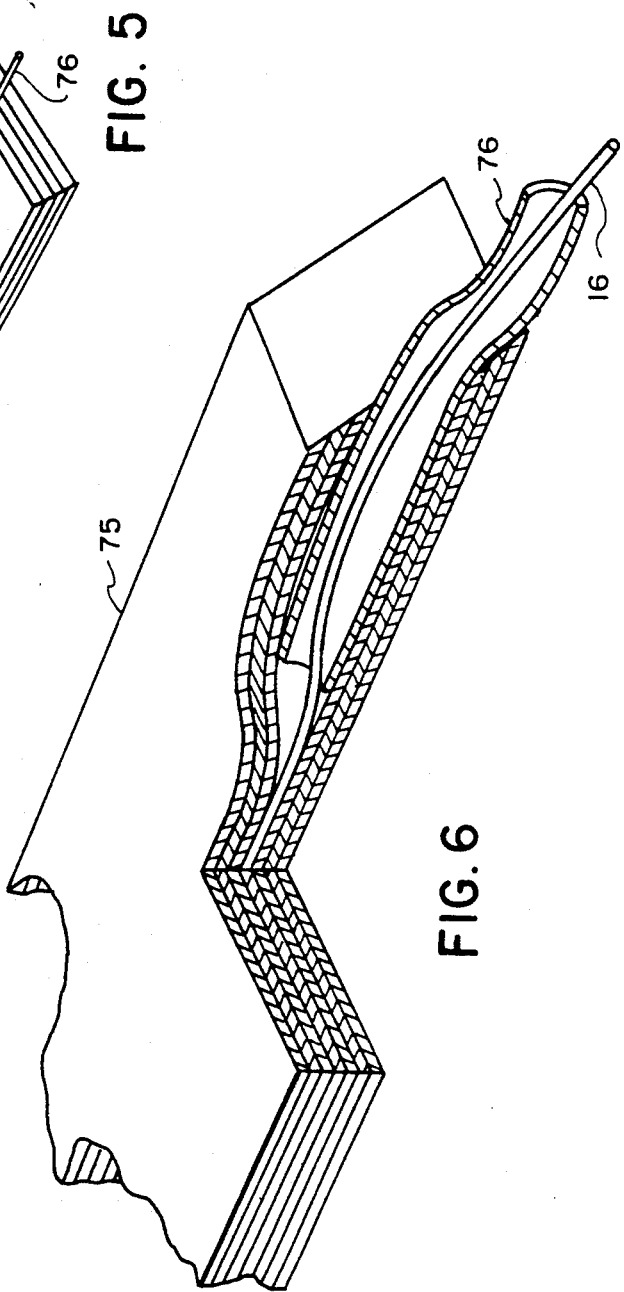
FIG. 6 shows apparatus used to access the fibers embedded in the composite structure of FIG. 5.

FIG. 5 represents the optical fiber portion of crack measuring unit 10 embedded into a laminated composite component 75. The measuring unit 10 is laid out on an internal ply of component 75 during fabrication, and additional plies are built on top of the measuring unit. An embedded optical fiber should be brought to the surface for connections in such a way that does not weaken the composite component and that avoids micro-bending of the fiber. In the embodiment of FIG. 5, the fiber exits the composite material through a small diameter semi-rigid, TEFLON tube 76 as is shown in detail in FIG. 6.

Figure 4:
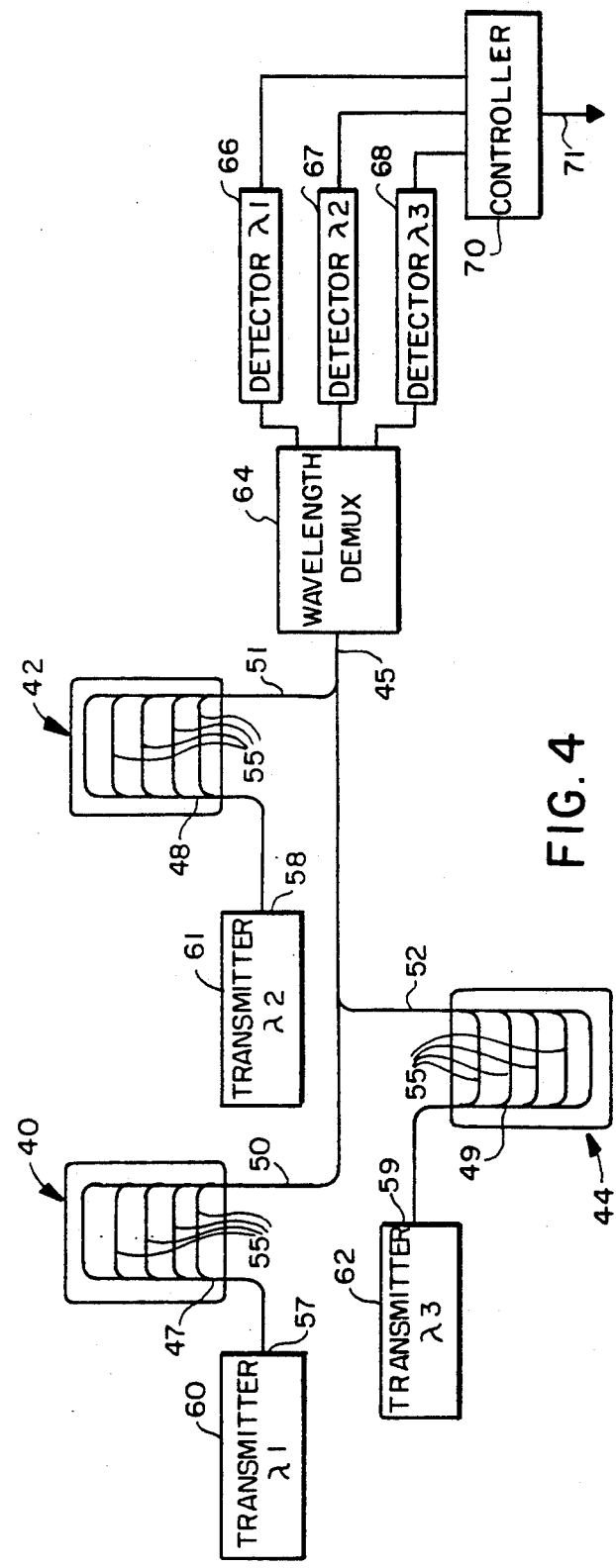
FIG. 4 is a block diagram of a wavelength division multiplexed crack advancement detection embodiment.

FIG. 4 represents an arrangement whereby multiple crack propagation measuring units of the type shown in FIG. 1 can be monitored over a single monitoring fiber 45 using wavelength division techniques. The arrangement of FIG. 4 comprises three crack measuring units 40, 42 and 44 each of which includes a respective primary fiber 47, 48 and 49, and a plurality of shunt fibers 55 which are connected to their associated primary fiber 47 through 49 in the same manner that shunt fibers 26 through 29 are connected between primary fiber sections 16 and 18 of FIG. 1. Each of the primary fibers includes an output end 50, 51 and 52 which is fused into the single monitoring fiber 45 in the manner of FIG. 3 and an input end 57, 58 and 59 respectively, each of which is connected to a different input transmitter 60, 61 and 62. Each transmitter 60, 61 and 62 transmits into its associated primary fiber input 57, 58 and 59 light energy having a different wavelength than is transmitted into the other primary fiber inputs. This wavelength difference is denoted in FIG. 4 by the association of one of the wavelength symbols $\lambda1$, $\lambda2$ and $\lambda3$ with each transmitter. In the present embodiment $\lambda1=785$ nanometers, $\lambda2=825$ nanometers, and $\lambda3=865$ nanometers. The actual wavelengths used is a matter of design choice, however, a separation of wavelengths of approximately 40 nanometers has been found to be advantageous.

Monitoring fiber 45 is connected to a wavelength division de-multiplexer 64 which receives incoming optical energy from monitor fiber 45 and splits that energy into three wavelength components centered around wavelengths. 80 1, $\lambda2$, and $\lambda3$. The separated wavelength components are each applied to a separate detector tuned to detect light energy at the separated wavelength. In FIG. 4, detector 66 detects wavelength λ1, detector 67 detects λ2 and detector 68 detects λ3.

In operation, each of the transmitters 60 through 62 applies to its associated primary fiber 47, 48 and 49, a unique wavelength of light energy as compared to the other transmitters. As a crack or other occurrence breaks the primary fiber 47 of crack detection unit 40 or of the associated shunt fibers 55, the light energy of the wavelength λ1 of transmitter 60 is reduced on monitor fiber 45. This reduction in light energy is detected by the detector 66 responsible for that wavelength, and such reduction in energy is reported to controller 70. Reduction in light energy through the other crack detection units 42 and 44 is similarly detected by detectors 67 and 68 respectively. As discussed with regard to FIG. 1, controller 70 reports any such detected reduction in received light energy over a communication path 71.

The present invention is not limited to the above-described embodiments, but extends to cover other embodiments not shown or described. For example, the optical connections between primary optical fibers and shunt optical fibers could be of a modular variety, rather than the fused couplings described above. Such modular couplings would facilitate assembly of the crack monitoring system, but would add substantially to its size. Also, in the preceding embodiment of FIG. 4, optically distinctive signals of different wavelengths were applied to the various crack detector units 40, 42 and 44. Other arrangements for producing optically distinct signals could be employed such as, for example, modulating the plurality of light energy sources with different modulating frequencies also produces optically distinct signals.

Further, in systems using the present invention the distinctive signals on monitoring fiber 45 need not be optically distinctive. For example, time division techniques can be employed in which each transmitter 60, 61 and 62 is separately energized to transmit at different times and crack detector arrangement can distinguish between crack detectors 40, 42 and 44 by knowing which detector is being energized when particular optical signals are being received.

What is claimed is:

1. An apparatus for optically measuring the propagation of a crack in a structure, comprising:
   a substrate attachable to the structure in which the crack is expected to propagate;
   a primary optical fiber attached to said substrate, said primary optical fiber having means for receiving light energy at a first end and means for delivery light energy at a second end; and
   a shunt optical path optically connected to said primary optical fiber in optical parallel with a portion of said primary optical fiber so that as the crack propagates the shunt optical path will be stressed by crack propagation causing a change in the light energy available at the second end of the primary optical path.

2. The apparatus of claim 1 comprising a detector responsive to changes in the amount of light energy delivered to said second end for generating crack propagation signals.

3. The apparatus of claim 1 wherein said shunt optical path comprises a plurality of shunt optical fibers each optically connected to said primary optical fiber in optical parallel with said portion of said primary optical fiber and attached to said substrate in a predetermined spatial arrangement.

4. The apparatus of claim 1 wherein said shunt optical path comprises a plurality of shunt optical fibers optically connected to said primary optical fiber in optical parallel with said portion of said primary optical fiber and attached to said substrate in parallel spatially with said portion of said primary optical fiber.

5. The apparatus of claim 3 wherein each optical connection between said primary optical fiber an one of said shunt optical fibers is a fused optical coupling.

6. The apparatus of claim 3 wherein each of said shunt optical fibers is optically connected to said primary optical fiber to receive a unique portion of light energy conveyed by said primary optical fiber, the unique light energy portion connected to each shunt optical fiber being different than the unique portion connected to the others of said shunt optical fibers whereby each shunt fiber has a unique light energy signature discernible by said detector.

7. The apparatus of claim 3 wherein said detector comprises means for generating a system integrity failure signal when the amount of light energy received by said detector from said primary optical fiber is below a predetermined amount.

8. An apparatus for measuring the propagation of a crack in a structure, comprising:
   an input optical fiber for receiving light energy;
   an output optical fiber for delivering light energy to a detector;
   a plurality of shunt optical fibers, each shunt optical fiber having a first end optically connected to receive light energy from said input optical fiber and having a second end optically connected to deliver light energy received from said input optical fiber to said output optical fiber;
   means for attaching said shunt optical fibers to said structure in a predetermined spatial pattern in an area of potential structural stress; and
   said detector comprising means responsive to the amount of light energy received from said output optical fiber for detecting the propagation of a crack in the area of potential structural stress.

9. The apparatus of claim 8 comprising a substrate to which said input optical fiber, said output optical fiber and said shunt optical fibers are attached and said attachment means comprises means for attaching said substrate to said structure.

10. The apparatus of claim 8 wherein each optical connection between said shunt optical fibers and said input and output optical fibers is a fused optical coupling.

11. The apparatus of claim 10 wherein each of said shunt optical fibers is optically connected by one of said fused optical couplings to receive a unique portion of the light energy conveyed by said input optical fiber whereby each of said shunt optical fibers has a unique signature discernible by said detector.

12. The apparatus of claim 8 wherein said detector comprises means for generating a system integrity failure signal when the amount of light energy received by said detector from said output optical fiber is below a predetermined amount.

13. The apparatus of claim 7 wherein said attaching means attaches said shunt optical fibers to said structure in lines parallel with one another and spaced apart by predetermined distances.

14. An apparatus for measuring the propagation of a crack in a structure, comprising:
- a stress sensing optical fiber means embedded in said structure in a predetermined spatial pattern, said stress sensing means comprising an input optical fiber, an output optical fiber, and a plurality of shunt path optical fibers, each shunt path optical fiber having a first end optically connected to receive light energy from said input optical fiber and having a second end optically connected to deliver light energy received from said input optical fiber to said output optical fiber;
- connecting means for connecting light energy to said input optical fiber and for connecting light energy from said output optical fiber to a detector; and
- said detector comprising means responsive to the amount of light energy received from said output optical fiber for detecting the propagation of a crack in said structure.

15. The apparatus of claim 14 further comprising at least one flexible, hollow tube for receiving at least one of said input optical fiber and said output optical fiber, said tube extending from a first end embedded in said structure to a second end outside of said structure.

16. An optical system for measuring crack propagation in a structure, comprising:
- a plurality of crack propagation measuring means each having an input optical fiber for receiving input light energy, an output optical fiber and a shunt optical path for conveying from said input optical fiber to said output optical fiber an amount of light energy indicative of the propagation of a crack in said structure;
- a monitoring fiber optically connected to the output optical fibers of each of said plurality of crack propagation measuring means for receiving light energy conveyed thereby;
- optical source means for coupling an individual one of a plurality of optically distinctive light energy signals to each of said input optical fibers; and
- detection means connected to receive light energy signals from said monitoring fiber for separately detecting changes in the amount of light energy of each of said optically distinctive light energy signals and for generating signals representing such changes in detected light energy.

17. The apparatus of claim 16 wherein said optical source means comprises means for coupling optically distinctive light energy signals each having a different one of a plurality of wavelengths to each of said input optical fibers, and said detection means comprises means for separating received light energy by wavelength, and means for detecting changes in the amount of light energy received at each of said plurality of wavelengths.

18. The apparatus of claim 16 wherein the shunt optical path of each of said plurality of crack propagation measuring means comprises a plurality of shunt optical fibers, each shunt optical fiber having a first end optically connected to receive light from said input optical fiber and having a second end optically connected to deliver light energy received from said input optical fiber to said output optical fiber.

19. The apparatus of claim 16 wherein said shunt optical path of each of said plurality of crack measuring means comprises a plurality of shunt optical fibers optically connected in parallel between said input optical fiber and said output optical fiber and attached to said structure in lines parallel with one another and spaced apart by predetermined distances.

20. The apparatus of claim 18 comprising means for attaching said input optical fiber, said output optical fiber and said shunt path fibers to said structure in an area of potential structural stress.

21. An optical system for measuring crack propagation in a structure, comprising:
- a plurality of crack propagation measuring means each having an input optical fiber for receiving input light energy, an output optical fiber and a shunt optical path for conveying from said input optical fiber to said output optical fiber, an amount of light energy indicative of the propagation of a crack in said structure;
- a monitoring fiber optically connected to the output optical fibers of each of said plurality of crack propagation measuring means for receiving light energy conveyed thereby;
- optical source means for coupling distinctive light energy signals to each of said input fibers; and
- detection means connected to receive said distinctive light energy signals from said monitoring fiber, for separately detecting changes in the amount of light energy in each of said received distinctive light energy signals and for generating signals representing such changes in detected light energy.

22. A method of optically measuring the propagation of a crack in a structure, said method comprising:
- attaching a plurality of crack detection fibers to said structure in an area of anticipated crack propagation;
- optically connecting each of said crack detection fibers to an input optical fiber;
- optically connecting each of said crack detection fibers to an output optical fiber;
- applying optical energy to said input optical fiber; and
- detecting reductions in the amount of optical energy conveyed by said output optical fiber to measure crack propagation.

23. The method of claim 22 wherein said attaching step comprises attaching said plurality of crack detection fibers to said structure in a predetermined spatial pattern.

24. The method of claim 22 wherein said attaching step comprises attaching said plurality of crack detection fibers to a substrate in a predetermined spatial pattern and attaching said substrate to said structure.

25. The method of claim 23 wherein the step of optically connecting said crack detection fibers to said input optical fiber comprises connecting each of said crack detection fibers to said input optical fiber such that each of said crack detection fibers receives a unique amount of light energy from said input optical fiber, the unique light energy amount connected to each crack detection fiber being different than the unique amount connected to the others of said crack detection fibers whereby each of said crack detection fibers has a unique light energy signature.

26. The method of claim 25 wherein said detecting step comprises identifying the breakage of one of said crack detection fibers from a reduction in the amount of optical energy conveyed by said output optical fiber substantially equal to the unique optical energy signature of said one crack detection fiber.

* * * * *

UNITED STATES PATENT AND TRADEMARK OFFICE
CERTIFICATE OF CORRECTION

PATENT NO. : 5,142,141
DATED : August 25, 1992
INVENTOR(S) : Talat et al.

It is certified that error appears in the above-identified patent and that said Letters Patent is hereby corrected as shown below:

column 5, line 41, after "detector" insert --25--.

column 5, line 58, change "8" to --18--.

column 6, line 66, change "wavelengths. 80 1" to --wavelengths $\lambda 1$,--.

column 7, line 52 (Claim 1), change "delivery" to --delivering--.

column 8, line 10 (Claim 5), change "an" to --and--.

column 8, line 14 (Claim 6), after "of" insert --the--.

column 8, line 65 (Claim 13), change "Claim 7" to --Claim 8--.

Signed and Sealed this

Twenty-sixth Day of October, 1993

*Attest:*

BRUCE LEHMAN

*Attesting Officer*     *Commissioner of Patents and Trademarks*